United States Patent
Cuny et al.

(10) Patent No.: US 8,186,984 B2
(45) Date of Patent: May 29, 2012

(54) TIRE MOLD AND TIRE WITH INTERNAL GROOVES IN TIRE TREAD

(75) Inventors: Andre Cuny, Habay la Neuve (BE); Frank Pierre Severens, Arlon (BE); Bruno Pierre Maitre, Strassen (LU); Jérôme Marcel Germain Delu, Bridel (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 101 days.

(21) Appl. No.: 12/906,490

(22) Filed: Oct. 18, 2010

(65) Prior Publication Data

US 2011/0151039 A1    Jun. 23, 2011

Related U.S. Application Data

(60) Provisional application No. 61/287,470, filed on Dec. 17, 2009.

(51) Int. Cl.
*B29C 33/44* (2006.01)
*B29C 35/02* (2006.01)
(52) U.S. Cl. .......... 425/28.1; 425/37; 425/438; 425/470
(58) Field of Classification Search ............... 425/28.1, 425/37, 438, 468, 470
See application file for complete search history.

(56) References Cited

U.S. PATENT DOCUMENTS

| 1,733,064 | A | * | 10/1929 | Lambert | 425/37 |
|---|---|---|---|---|---|
| 3,718,721 | A |  | 2/1973 | Gould et al. | 264/40 |
| 6,143,223 | A | * | 11/2000 | Merino Lopez | 425/46 |
| 6,318,984 | B1 | * | 11/2001 | Lopez | 425/28.1 |
| 6,402,489 | B1 | * | 6/2002 | Dyer | 425/37 |
| 7,338,269 | B2 | * | 3/2008 | Delbet et al. | 425/37 |
| 8,075,294 | B2 | * | 12/2011 | Cuny et al. | 425/37 |
| 2005/0224151 | A1 |  | 10/2005 | Benedittis et al. | 152/209.16 |

FOREIGN PATENT DOCUMENTS

| EP | 1125709 A1 | 8/2001 |
|---|---|---|
| EP | 2202041 A1 | 6/2010 |
| JP | 8-142057 | 6/1996 |
| JP | 2002-307442 A | 10/2002 |

OTHER PUBLICATIONS

European Search Report, dated Apr. 7, 2011.

* cited by examiner

*Primary Examiner* — James Mackey
(74) *Attorney, Agent, or Firm* — June E. Rickey

(57) ABSTRACT

A tire mold is described that includes a plurality of tread molding segments having an inner surface for molding the tire tread. The mold further includes a plurality of sidewall plates having an inner surface for molding the tire sidewall. The tread mold segments together with the sidewalls cooperate to form a tire molding cavity. The sidewall plate further comprises a slot that extends from the outer surface of the tread segment to the inner mold surface, and has a pin extending from the outer surface of the tread segment. The pin is mounted to a rotatable body which can swivel. The rotatable body further comprises a guide pin which cooperates with a working member to rotate the body into a desired position in order to position the pin in the tire tread to be molded. The working member actuates the rotatable body into various positions.

9 Claims, 16 Drawing Sheets

Position 1

Position 2

TIRE MOLD AND TIRE WITH INTERNAL GROOVES IN TIRE TREAD

CROSS REFERENCE TO OTHER APPLICATIONS

This application claims the benefit of and incorporates by reference U.S. Provisional Application No. 61/287,470 filed Dec. 17, 2009.

FIELD OF THE INVENTION

The invention relates to a method and apparatus for forming grooves in a pneumatic tire, and more particularly to forming grooves in a tire tread.

BACKGROUND OF THE INVENTION

Creation of internal grooves in the tread area of a tire may have several advantages. First, the grooves may increase the flexibility of the tire when the tire is worn, while permitting a stiffness in the tire when the tire is new. Second, internal grooves may decrease the heat generation in the tire that is built up when the tire is rolling. The grooves act as a pump to evacuate the hot air from the tire as the tire rolls through its footprint. Second, grooves may be used in conjunction with circumferential or radial grooves to permit better water evacuation and decrease the risk of aquaplaning. The grooves may also be used to mount temperature sensing devices to monitor the shoulder temperature. The grooves may be also used to install retractable stud pins for enhanced winter driving.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

BRIEF DESCRIPTION OF THE DRAWINGS

The invention will be described by way of example and with reference to the accompanying drawings in which:

FIG. 15A illustrates the rotatable body with the pin shown offset with respect to the rotatable body;

DETAILED DESCRIPTION OF THE INVENTION

Figure 14A:
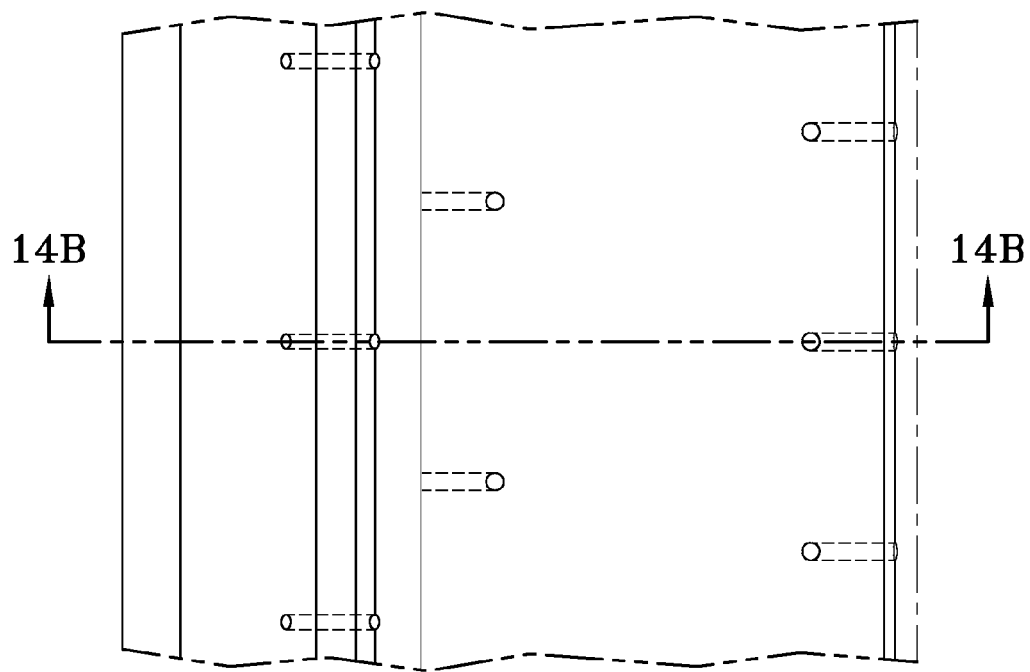
FIG. 14A is a top view of a portion of an outer tread surface of a tire tread.
Figure 14B:
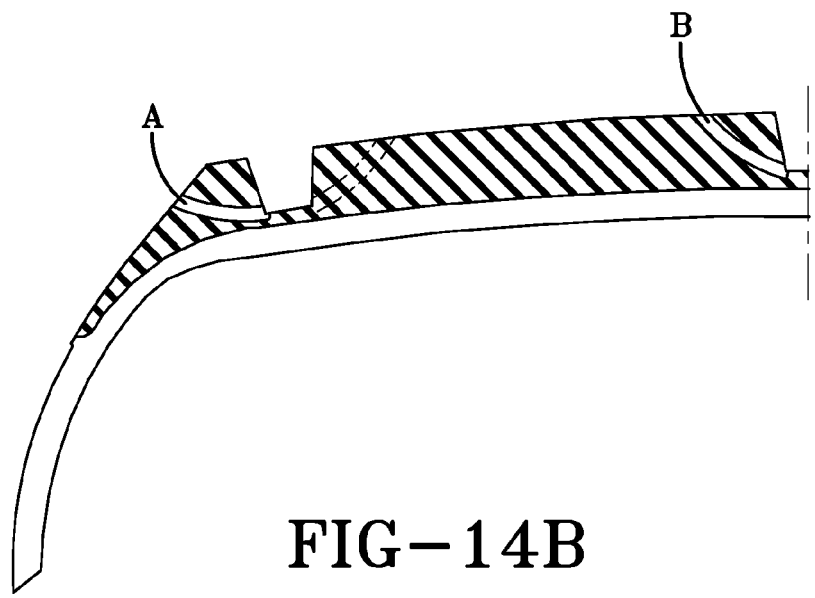
FIG. 14B is a cross-sectional of the tire tread of FIG. 14A in the direction B-B.

Referring to the drawings and particularly to FIGS. 1-14, a first embodiment of a groove forming apparatus 10 for use with a tire mold is shown. The groove forming apparatus 10 is useful for molding lateral grooves A in the side of a tire or for forming grooves B below a tire tread surface, such as shown in FIGS. 14A and 14B. The groove forming apparatus 10 may be useful in mold such as a segmented mold which typically includes a plurality of segments 20 for forming the grooves of a tire tread. Each tread molding segment 20 has an inner surface 21 for molding the tire tread. The tread molding segments cooperate with a sidewall plate 22 (only 1 shown) for molding the sidewall portion of a green tire carcass C. The sidewall plates 22 have an inner surface 23 for molding the tire sidewall. The tread mold segments together with the sidewalls cooperate to form a tire molding cavity.

Figure 1:
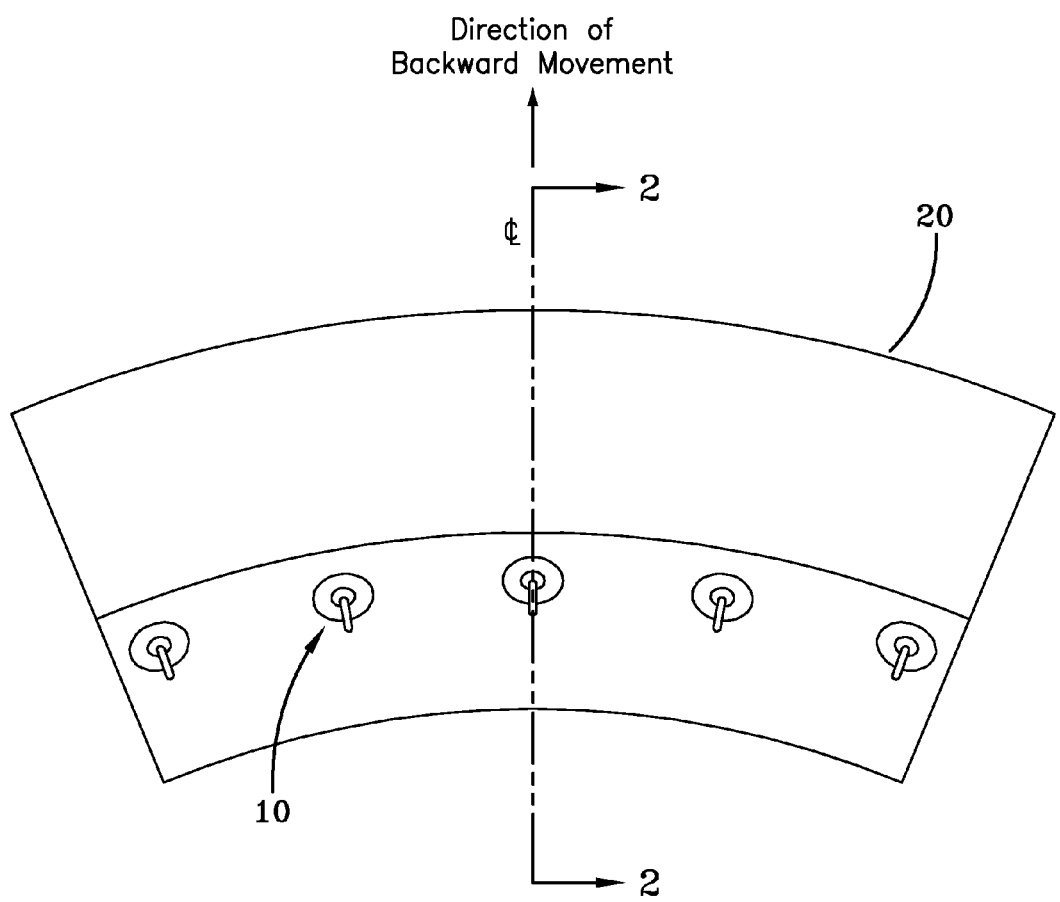
FIG. 1 is a top view of a segment of a tire mold.
Figure 2:
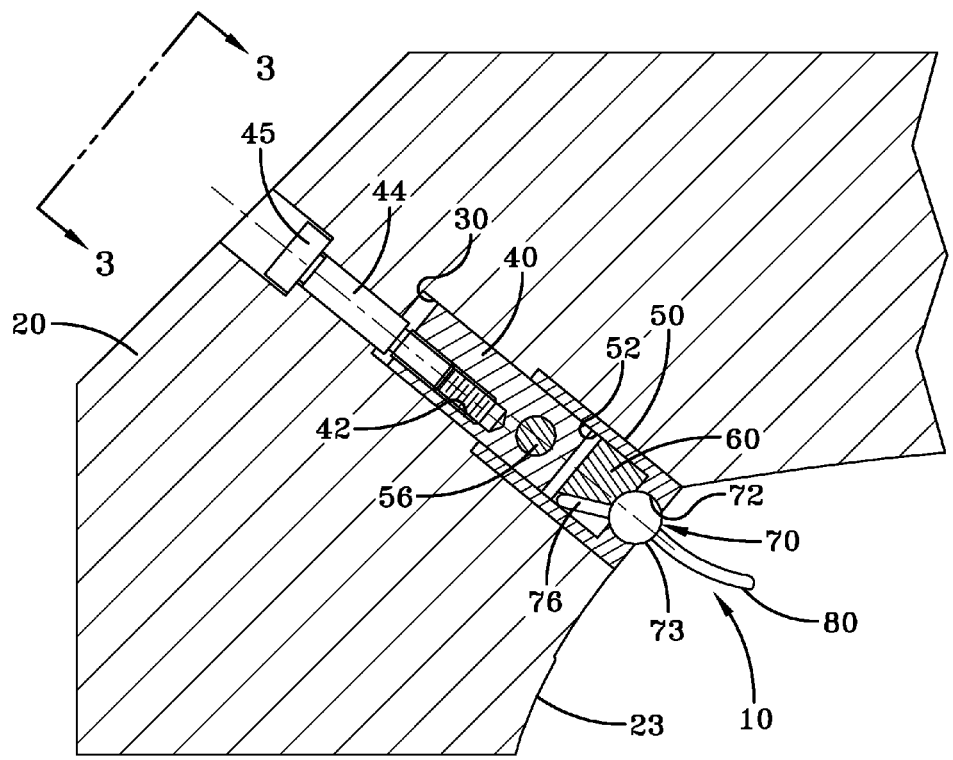
FIG. 2 is a cross-sectional view of the mold segment of FIG. 1 in the direction 2-2.
Figure 3:
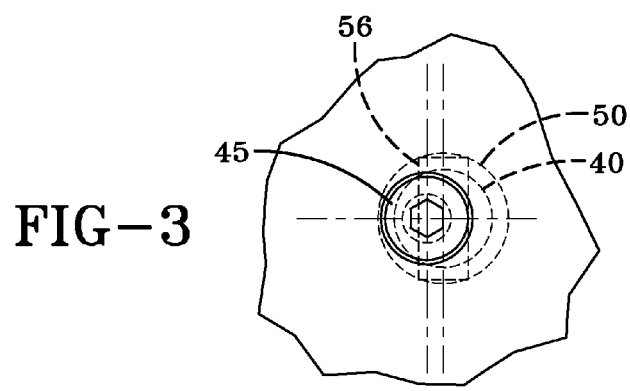
FIG. 3 is a close-up cross-sectional view of a portion of the mold segment of FIG. 2 shown in the direction 3.

FIG. 2 illustrates a portion of the tread molding segment which has a bore 30 formed therein. Positioned within the bore is the groove forming apparatus 10. The groove forming apparatus 10 includes a first cylindrical housing 40. The cylindrical housing 40 is secured to the segment 20 with a screw 44 within a threaded bore 42. As shown in FIG. 2, the screw 44 is preferably offset from the cylindrical housing 40.

The groove forming apparatus 10 further comprises a second cylindrical housing 50 having a large central hole 52. A portion of the first cylindrical housing is received within the second cylindrical housing and secured thereto by a transverse pin 56. Also received within the second cylindrical housing 50 is a working member 60. The working member functions as a spring as described in more detail below, and may comprise for example, a silicone material which is elastic. One example of a silicone material suitable for use is sold by Wacker Chemie AG under the trade name RTV-ME646. As shown in more detail in FIGS. 11-13, the working member 60 has an upper end 62 and a specially shaped slot 64.

Figure 15A:
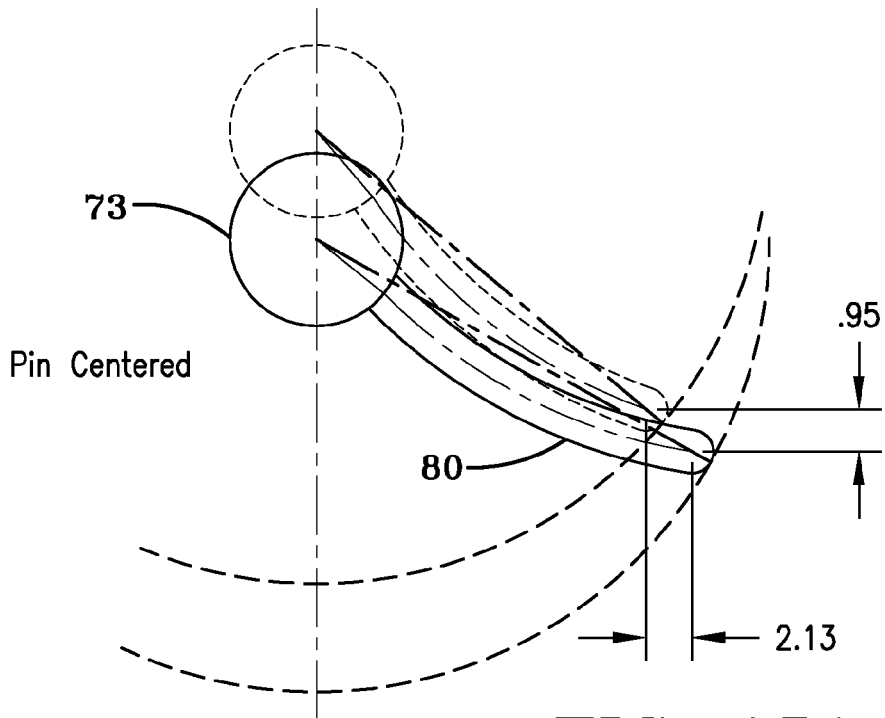
FIG. 15A illustrates the rotatable body with the pin shown centered with respect to the rotatable body.
Figure 15B:
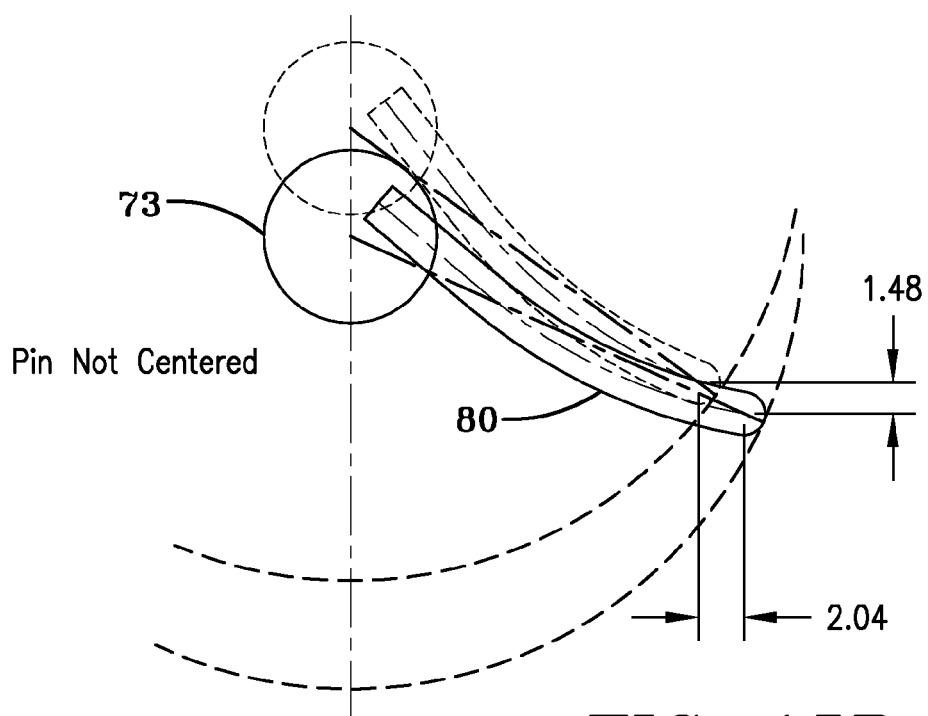
Figure 16:
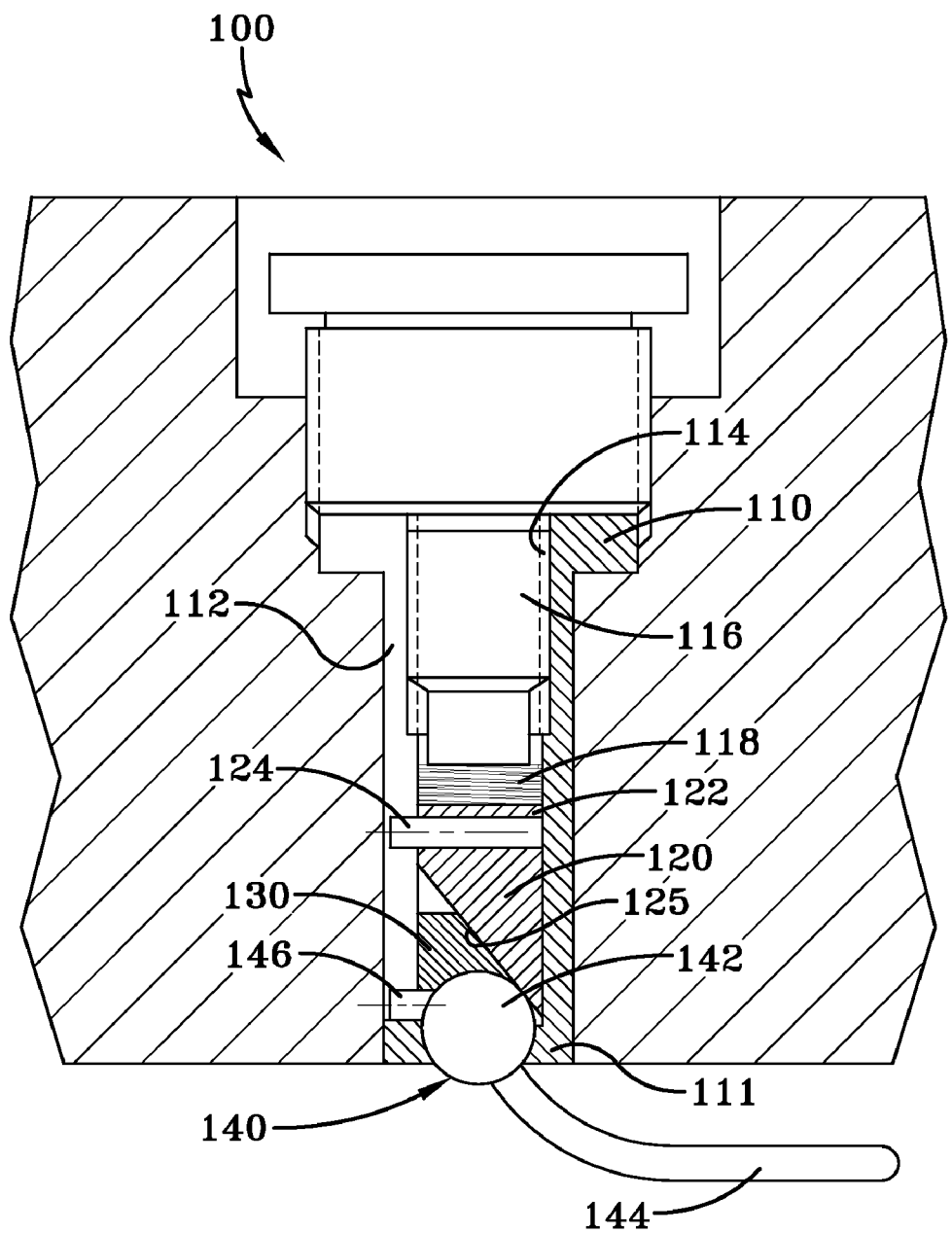
FIG. 16 is a cross-sectional view of a second embodiment of a groove forming apparatus in a mold segment.
Figure 17:
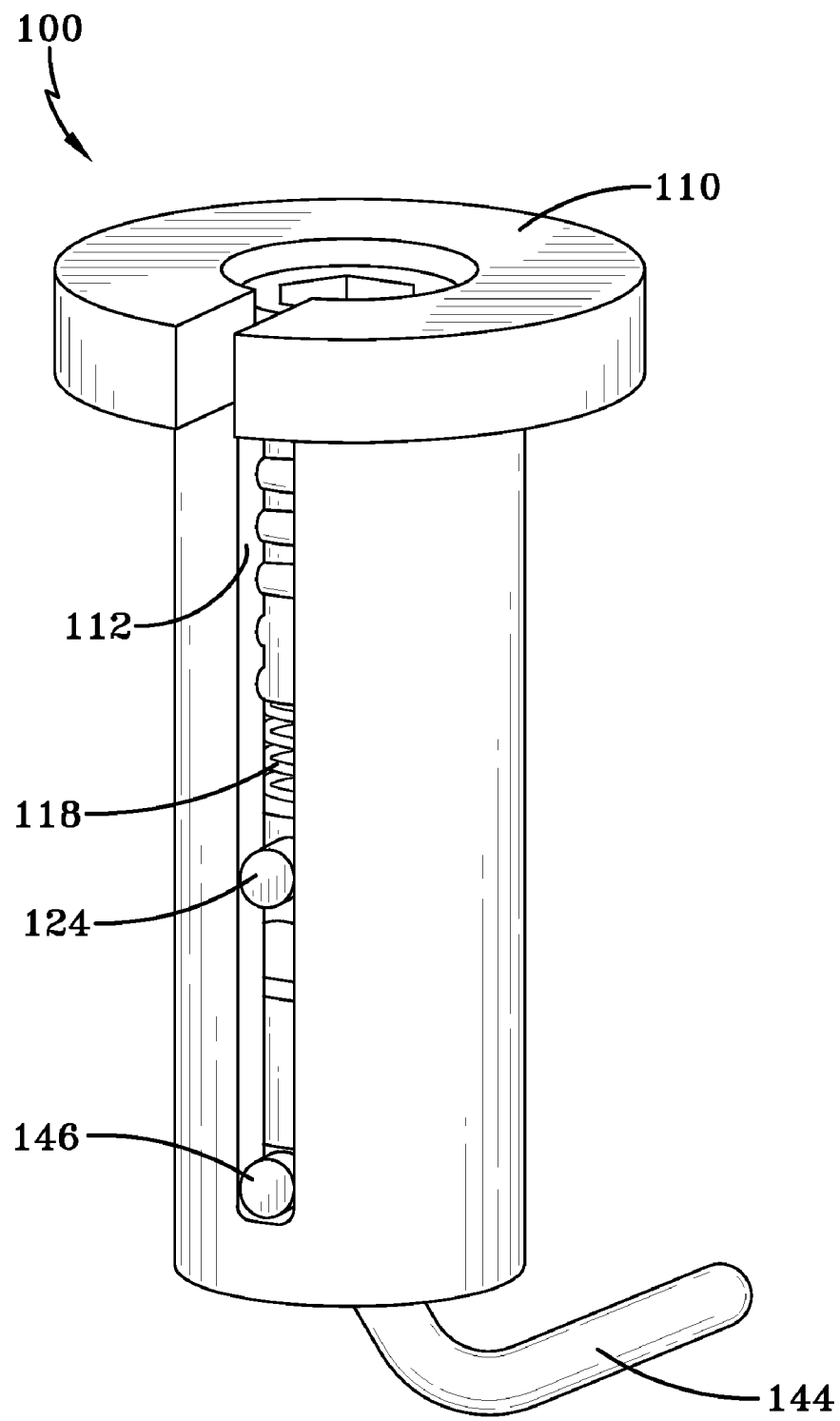
FIG. 17 is a perspective view of a second embodiment of the groove forming apparatus of FIG. 16.

Positioned within the specially shaped slot 64 of the working member 60 is an upper arm 76 of a rotatable member 70. The arm 76 has a distal end which may be received in a longitudinal slot 51 of the second cylindrical housing 50 when the pin 80 is in the start position (best shown in FIGS. 8B and 9). The rotatable member 70 is rotatably mounted within a rounded slot 72 of the second cylindrical housing 50. The rotatable member 70 has a rotatable body 73 that may have a spherical or cylindrical cross-sectional shape. The rotatable member 70 further comprises a pin 80 for molding a groove within a tire. The pin extends from the interior surface 21 of the segment into the mold cavity for engagement with an uncured tread portion of a tire. The pin 80 is preferably coated with polytetrafluorethylene (PTFE) or other low friction material for ease of extraction from a cured tire. FIG. 15A illustrates that the pin longitudinal axis is aligned or "centered" with the center of the rotatable body 73, while FIG. 15B illustrates that the pivoting pin may be offset from the rotatable body 73.

Figure 4:
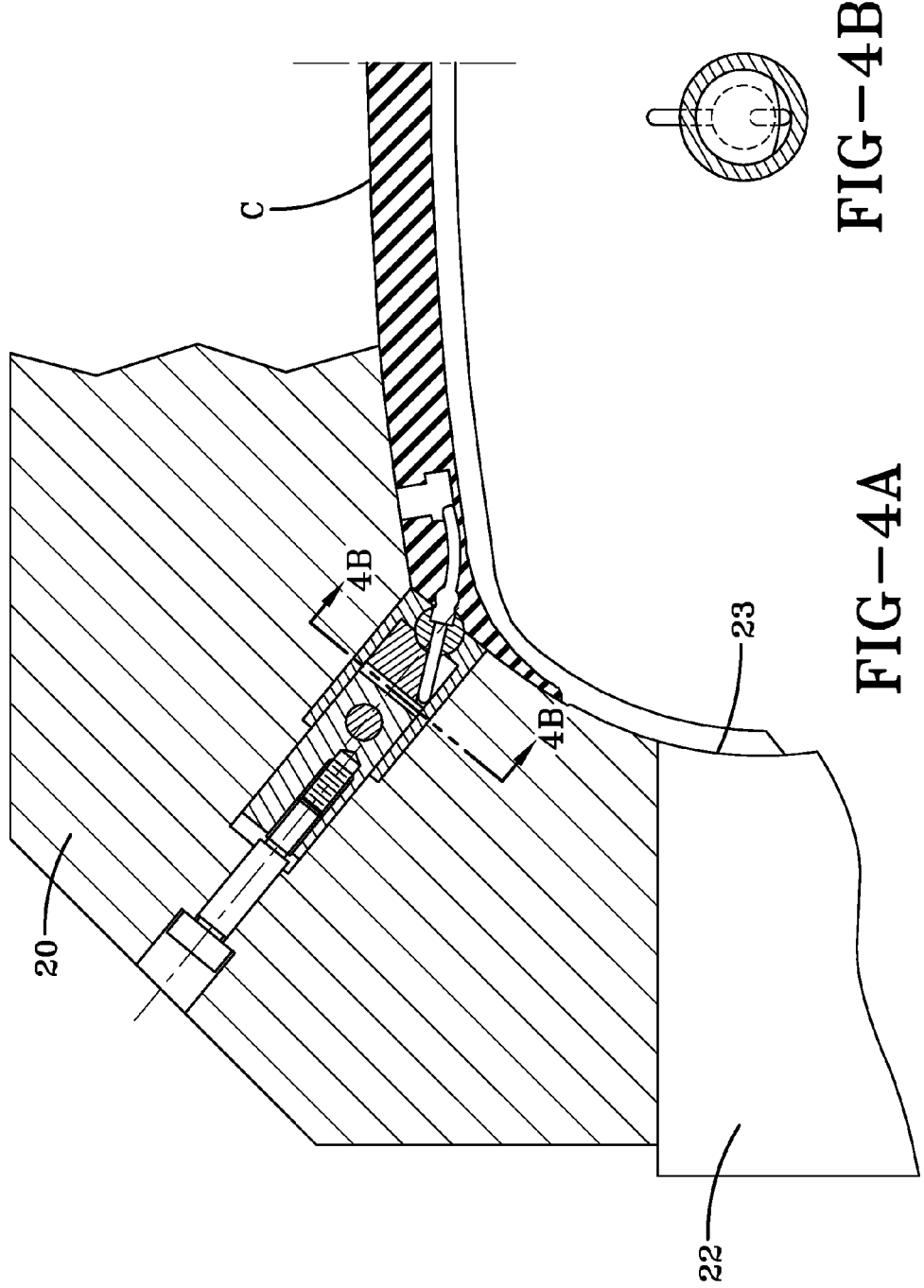
FIG. 4 is a top cross-sectional view of a portion of a mold and a portion of the segment of FIG. 1 during a green tire undergoing the cure cycle.
Figure 8A:
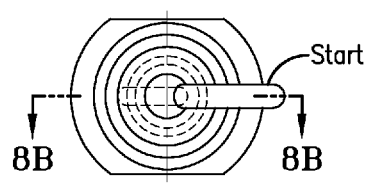
FIG. 8A is a top view of the apparatus of the present invention in the start position.
Figure 10A:
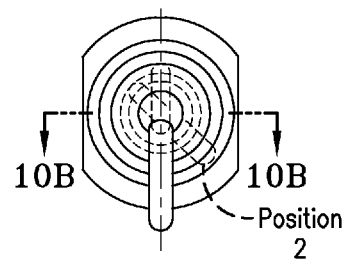
FIG. 10A is a top view of the apparatus of the present invention shown in the rotated position.
Figures 8B, 9, 10B:
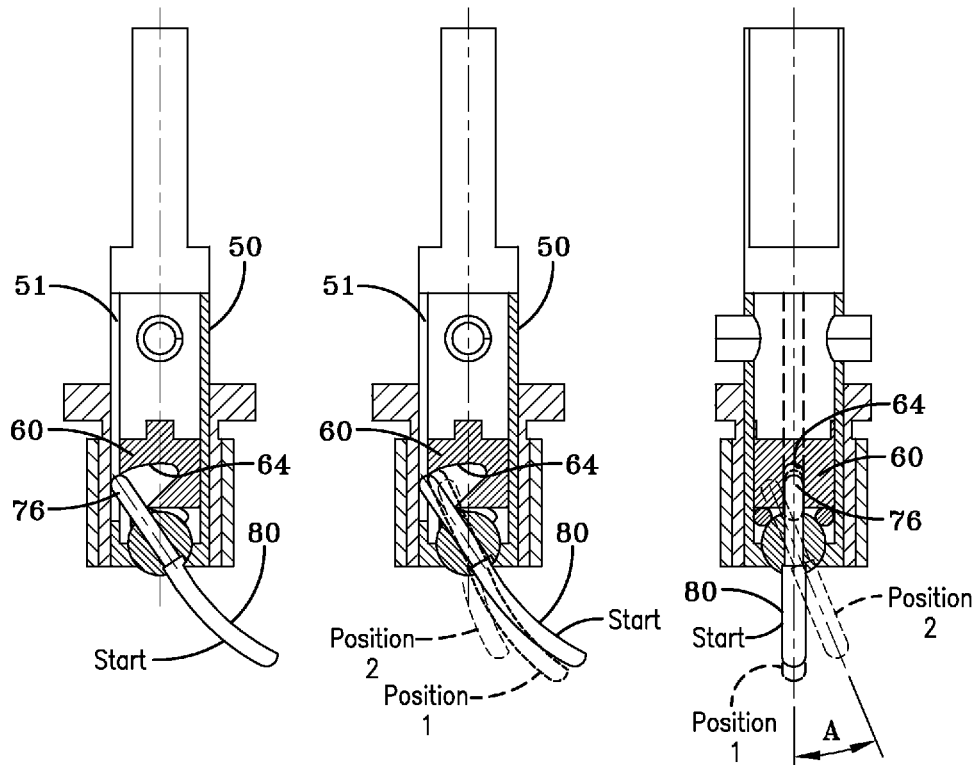
FIG. 8B is a cross-sectional view of the apparatus of the present invention in the direction 8B-8B.
FIG. 9 is a cross-sectional view of the apparatus of FIG. 8B illustrating the start position, position 1, and position 2.
FIG. 10B is a view of the apparatus of FIG. 9 in the direction 10B-10B.
Figure 11:
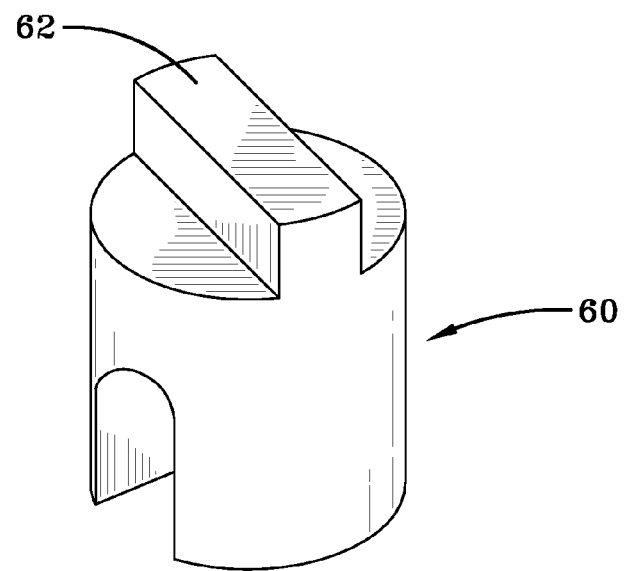
FIG. 11 is a perspective view of the working member.
Figure 12:
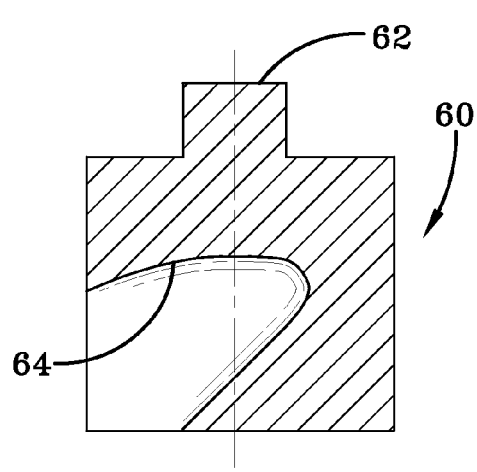
FIG. 12 is a cross-sectional view of the working member.
Figure 13:
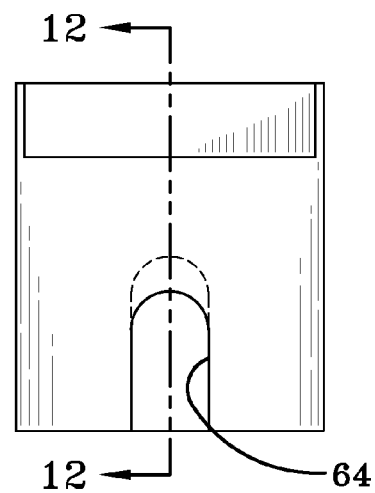
FIG. 13 is a side view of the working member.

The operation of the groove forming apparatus may now be described. FIG. 2 illustrates the groove forming apparatus prior to operation in the mold. FIGS. 8A and 8B illustrate in more detail the start position of the pin 80 with respect to the working member. As shown in FIG. 8B, the distal end of the arm 76 is positioned in a longitudinal slot 51 of the sleeve 50. FIG. 4 illustrates the groove forming apparatus 10 during the cure cycle, wherein the pin 80 is forming a groove in the shoulder of a tire tread.

Figure 5:
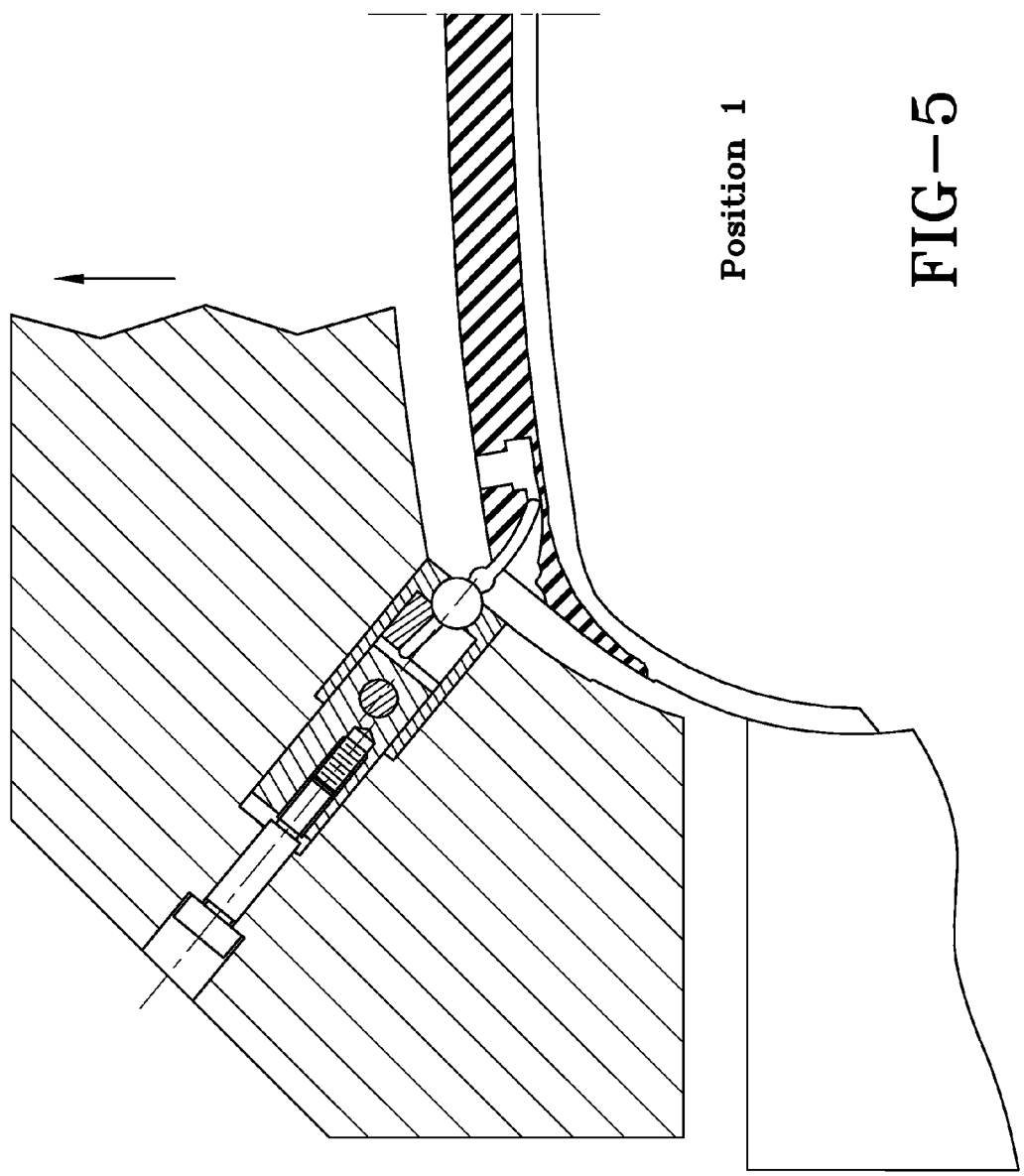
FIGS. 5 and 6 illustrate the apparatus of FIG. 4 after curing and during demolding of the inventions from a cured tire, respectively.
Figure 6:
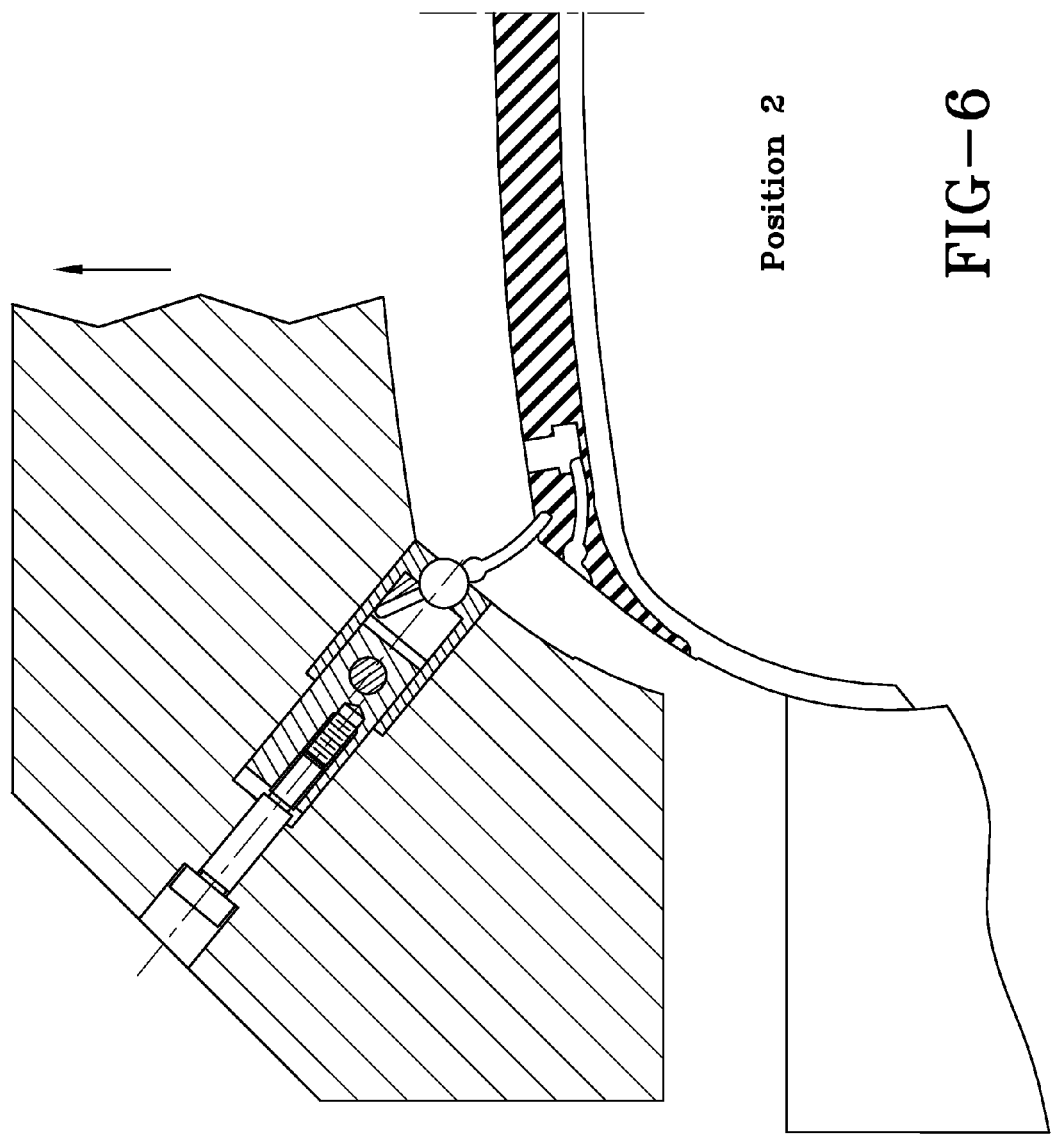
Figure 7:
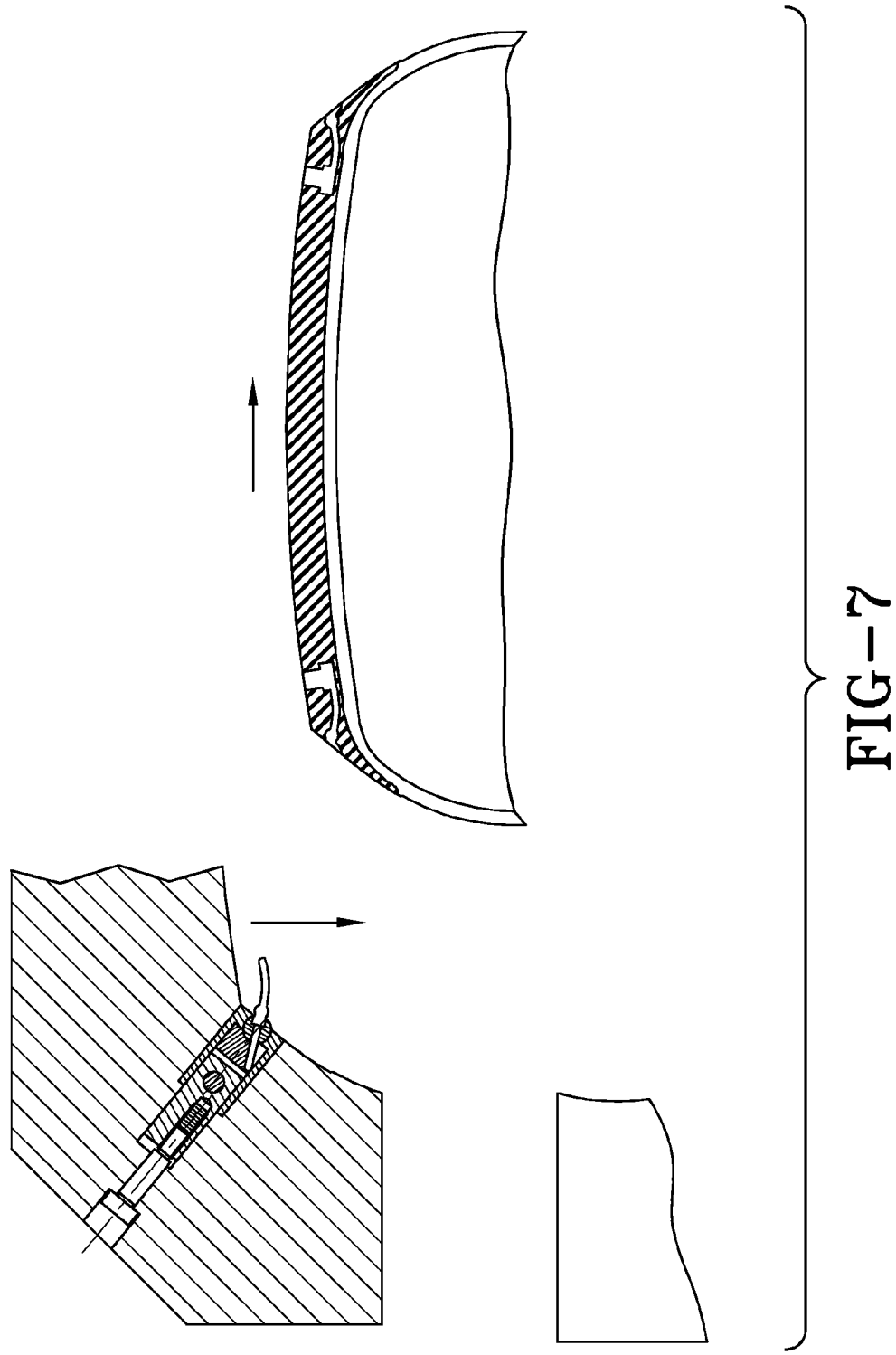
FIG. 7 illustrates the apparatus of the invention returning to its start position after demolding from a tire tread.

FIGS. 5 and 6 illustrate the groove forming apparatus after the tire has been cured and during the opening of the mold. The pin 80 is extracted from the cured tire during demolding. During demolding, the distal end of the arm 76 is no longer constrained by the longitudinal slot 51 of the sleeve. Thus the pin 80 can rotate an Angle A as shown in FIG. 10B (position 2) if the rotatable body 73 has a spherical shape. This rotation is possible during demolding if the mechanism 10 is not in the axis of demolding (see FIG. 1) that facilitates the extraction of the pin.

After demolding, the pin 80 resumes its start position, with its distal end of arm 76 being received in the longitudinal slot 51 of the sleeve 50. The pin 80 cannot rotate following the angle A.

FIGS. 16-21 illustrate a second embodiment of a groove forming apparatus 100. The groove forming apparatus 100 has a cylindrically shaped housing 110 that has an elongated longitudinally oriented slot 112. Positioned within an inner threaded hole 114 of the housing 110 is a set screw 116. A spring 118 is positioned between the lower end of the set screw 116 and a first working member 120 which has a upper cylindrical portion 122 having a pin 124 mounted therein. The pin is received within the slot 112. The first working member 120 has an angular face 125. Positioned adjacent the angular face 125 is a second working member 130, which is preferably made of a silicone material which is elastic. One example of a silicone material suitable for use is sold by Wacker Chemie AG under the trade name RTV-ME646.

Figure 18:
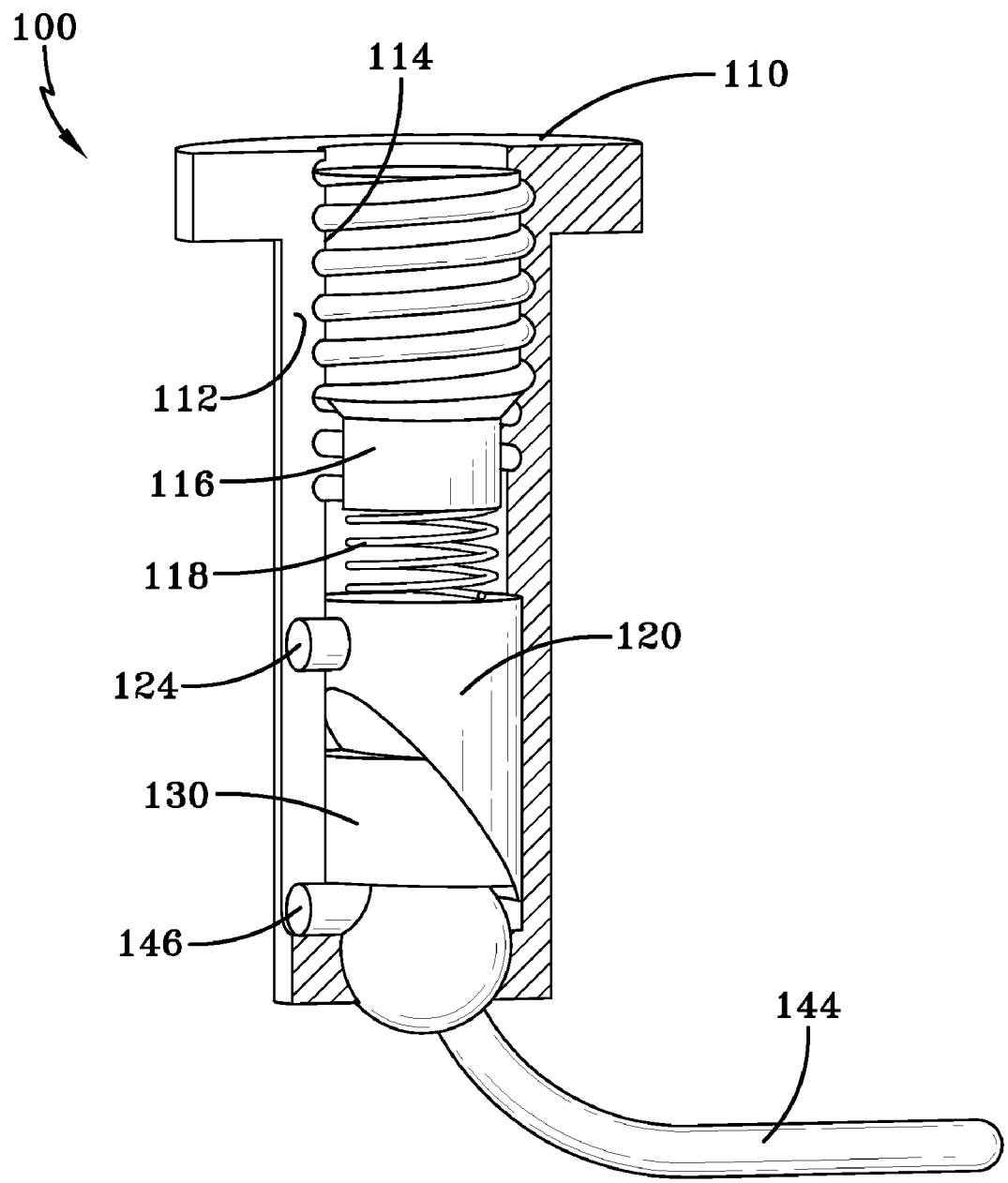
FIG. 18 is a cross-sectional view of the groove forming apparatus of FIG. 17 shown in the start position.

A pivoting pin 140 having a round body portion 142 is rotatably mounted within a distal end of 111 of the housing 110. Extending from the round body portion 142 is a pin member 144. A knob 146 extends from the round body 142, and wherein the knob 146 is positioned within the slot 112 of the housing. As shown in FIG. 18, the slot 112 constrains the pivoting pin 140 and prevents rotation of the pin member 144 during formation of the groove during cure.

Figure 19:
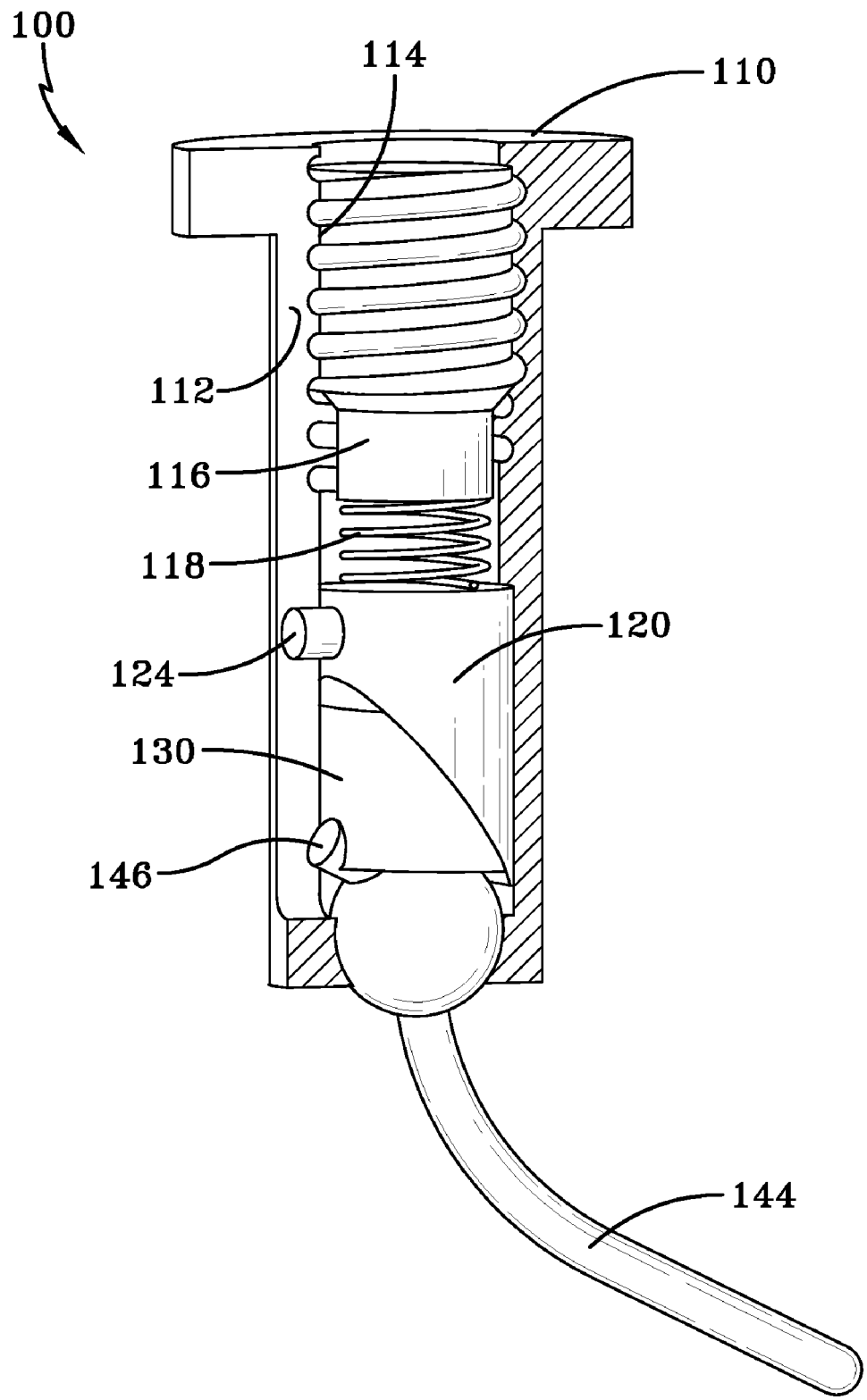
FIGS. 19-21 illustrate various positions of the groove forming apparatus during demolding.
Figure 20:
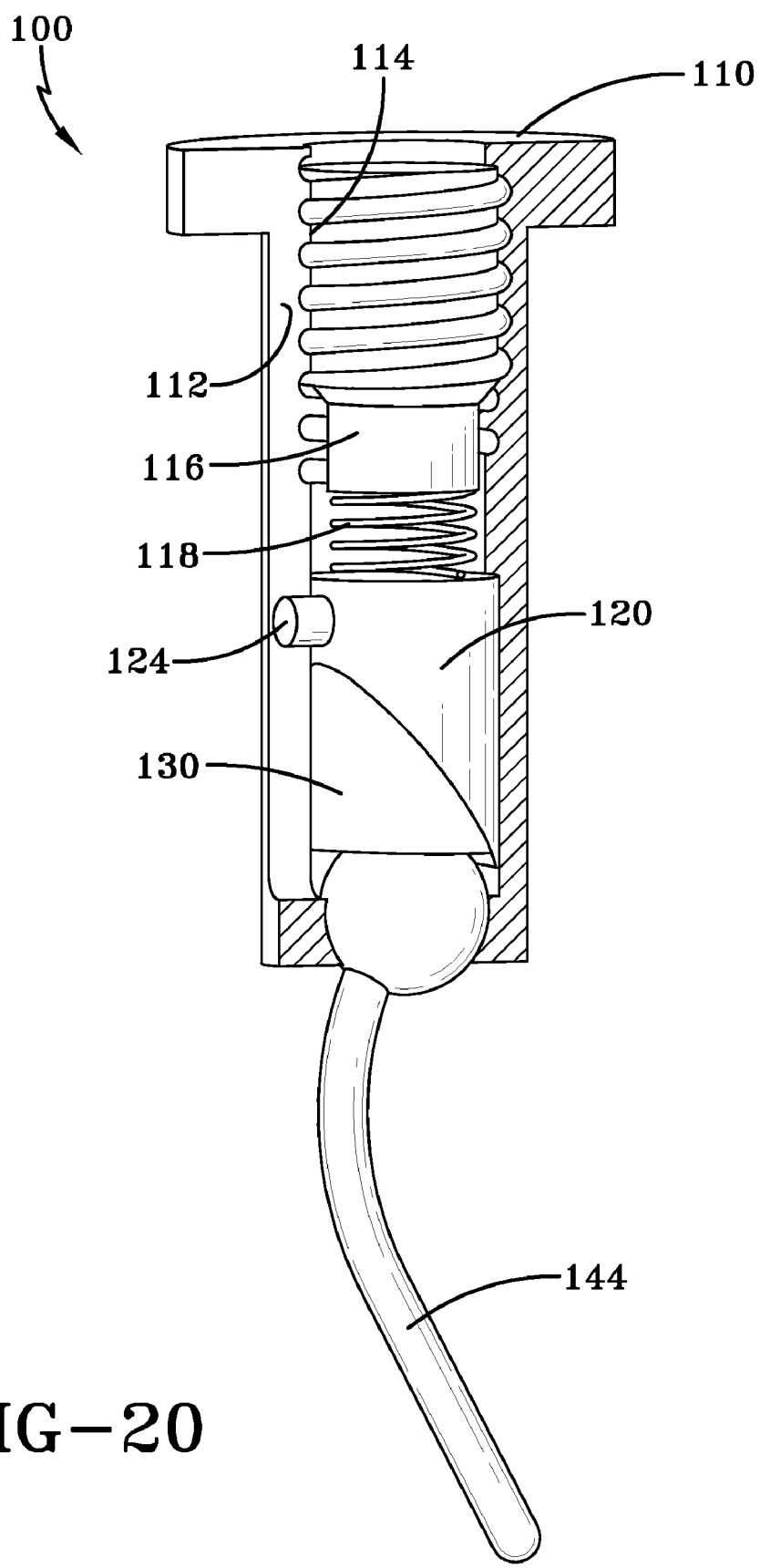
Figure 21:
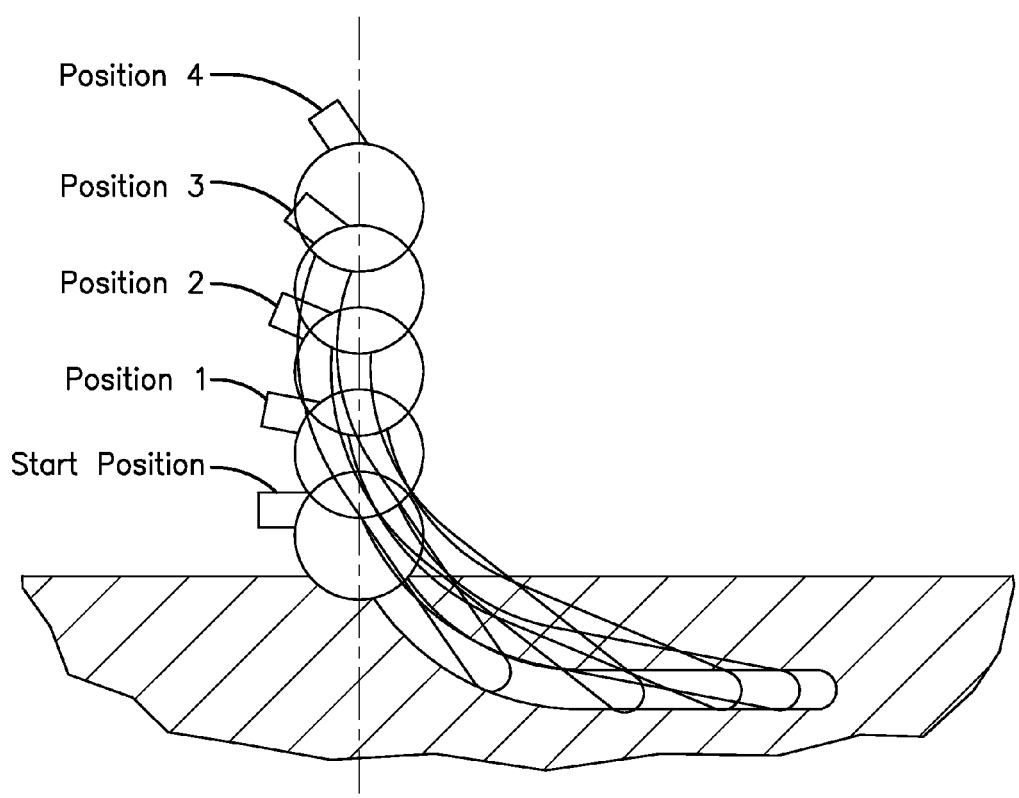

FIGS. 19-21 illustrate the pivoting pin during demolding. During demolding, extraction of the pin member 144 from the tire exerts a considerable force on the pin member 144. The pin member rotates during demolding, wherein the knob unseats from the slot 112 of the housing. The second working member 130 engages the angular face of the first working member as the pivoting pin rotates into various positions shown in FIG. 21.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire mold comprising: a plurality of tread molding segments having an inner surface for molding the tire tread, and a plurality of sidewall plates having an inner surface for molding the tire sidewall, wherein the tread molding segments together with the sidewall plates cooperate to form a tire molding cavity; wherein at least one of said tread molding segments further comprises a slot that extends from an outer surface of the tread molding segment to the inner mold surface, a groove forming apparatus is positioned within the slot and having an outer housing, a rotatable body is received within said outer housing, said rotatable body having a pin connected thereto, said pin extending into the molding cavity.

2. The mold of claim 1 wherein said mold further comprises actuating means for actuating said pin when said mold is closed.

3. A groove forming apparatus comprising: a cylindrical housing having a longitudinal slot; a rotatable member rotatably mounted within the housing, said rotatable member having a knob positionable within the longitudinal slot, and having a pin extending from the rotatable member.

4. The groove forming apparatus of claim 3 further comprising a first working member having an angular face, and a pin positioned within the longitudinal slot.

5. The groove forming apparatus of claim 4 further comprising a second working member made of silicone, wherein the second working member is positioned between the rotatable member and the first working member.

6. A groove forming apparatus comprising: a first cylindrical housing and a cylindrical sleeve connected thereto, said sleeve having a longitudinal slot; a rotatable member rotatably mounted within the sleeve, said rotatable member having an arm positionable within the longitudinal slot, and having a pin extending from the rotatable member.

7. The groove forming apparatus of claim 6 further comprising a working member positioned within the sleeve and located adjacent said arm.

8. The groove forming apparatus of claim 7 wherein the working member is made of silicone.

9. The groove forming apparatus of claim 7 wherein the working member has a longitudinal slot.

\* \* \* \* \*